United States Patent
Miyasaka et al.

(10) Patent No.: US 6,791,492 B2
(45) Date of Patent: Sep. 14, 2004

(54) GPS POSITIONING SYSTEM

(75) Inventors: Koji Miyasaka, Tokyo (JP); Masakazu Mori, Tokyo (JP); Yuji Kobayashi, Tokyo (JP); Kazuyuki Sakaki, Tokyo (JP); Kenichi Takasu, Tokyo (JP)

(73) Assignees: Mitsui & Co., Ltd., Tokyo (JP); Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/279,016

(22) Filed: Oct. 24, 2002

(65) Prior Publication Data

US 2003/0090415 A1 May 15, 2003

(30) Foreign Application Priority Data

Oct. 30, 2001 (JP) ........................................ 2001-332652

(51) Int. Cl.[7] ............................ H04B 7/185; G01S 5/02
(52) U.S. Cl. ................................. 342/357.13; 701/208
(58) Field of Search ..................... 342/357.01, 357.06, 342/357.12, 357.13; 701/208, 213, 215

(56) References Cited

U.S. PATENT DOCUMENTS

| 5,825,480 A | * | 10/1998 | Udagawa ..................... 356/138 |
| 5,838,330 A | * | 11/1998 | Ajima ......................... 345/427 |
| 6,249,720 B1 | * | 6/2001 | Kubota et al. ................. 701/1 |
| 6,604,049 B2 | * | 8/2003 | Yokota ....................... 701/213 |

* cited by examiner

Primary Examiner—Dao Phan
(74) Attorney, Agent, or Firm—Foley & Lardner LLP

(57) ABSTRACT

A GPS positioning system comprises a fixed station and a mobile station. The mobile station has: positional positioning means; imaging means; direction detecting means; and arithmetic processing means. The positional positioning means measures positional coordinates by receiving radio weve from a satellite. The imaging means is arranged in a predetermined position for the GPS positional positioning means. The direction detecting means detects a photographing direction during photographig by the imaging means. The arithmetic processing means forms landscape data in which imaging data that is an output from the imaging means is associated with orientation data that is an output from the direction detecting means.

16 Claims, 8 Drawing Sheets

GPS POSITIONING SYSTEM

BACKGROUND OF THE INVENTION

1. Technical Field of the Invention

The present invention relates to a GPS (Global Positioning System, which is referred to as a GPS hereinafter) positioning system in which positional coordinates can be found by receiving radio wave from a satellite.

2. Prior Art

Kinematic positioning in a GPS, when a basic combination of an antenna and a receiver, which is capable of GPS positioning, is defined as a station, is a survey method where a pair of stations arranged on a reference point in a fixed manner are made to be a fixed station, another movable station is made to be a mobile station, positioning is performed while sequentially moving the mobile station among a large number of survey points, and thus finding a relative positional coordinates for the fixed station. Note that the positional coordinates of the reference point are known.

There exists a real-time kinematic positioning (hereinafter, referred to as an RTK) as a developed type of the kinematic positioning. This is a positioning method where a position being a positioning result can be obtained in a real-time.

In the RTK, the fixed station and the mobile station simultaneously receive radio wave from a satellite, and positioning data is analyzed in the mobile station referring to receive data obtained by the fixed station. Accordingly, a relative coordinate from the reference point where the fixed station is installed to a positioning point of the mobile station can be immediately found.

Further, in transmitting the positioning data from the fixed station to the mobile station, a method of transmitting data by radio wave having a particular frequency from the fixed station has generally been used. Specifically, the fixed station has been provided with a radio transmitter (the frequency of 400 MHz and the output of about 10 mW, for example) to constantly transmit the positioning data, the mobile station has been equipped with a radio receiver capable of receiving the transmitted radio wave, and thus it has been able to randomly refer to the transmitted positioning data.

In the case of the RTK positioning, a positioning result obtained is a numerical value of the positional coordinates. Therefore, it is extremely difficult to recognize the condition or the like of a positioning operation site by the positional coordinates as the positioning result.

Although it is possible to recognize the condition of the operation site by photographing the site, the condition that can be grasped has a very ambiguous content, and it is impossible to know the specific relationship with a positioning point.

In addition, a point where positioning has originally been scheduled is turned out to be the one where positioning operation is difficult, for example. As described, since the circumstances and the condition of the operation site are difficult to predict, it is desired for an operator to flexibly deal with their changes on site.

However, when a problem is found in the positioning result after the positioning operation and the cause of erroneous positioning is based on the condition on site, its verification by the value of the positional coordinates is impossible. Thus, the problem due to the same cause is very likely to occur even if the positioning operation is performed again. Further, there is no way to accurately recognize it.

SUMMARY OF THE INVENTION

The object of the present invention is to make it possible to effectively and accurately grasp the condition of a site of a GPS positioning operation.

The GPS positioning system according to the present invention includes the fixed station and the mobile station.

The mobile station has: positional positioning means; imaging means; direction detecting means; and arithmetic processing means.

The positional positioning means is GPS positional positioning means that measures the positional coordinates by receiving radio wave from the satellite.

The imaging means is imaging means arranged in a predetermined position for the GPS positional positioning means.

The direction detecting means is direction detecting means that detects a photographing direction during photographing by the imaging means.

The arithmetic processing means is arithmetic processing means that forms landscape data in which imaging data that is an output from the imaging means is associated with orientation data that is an output from the direction detecting means.

The GPS positional positioning means finds positional coordinates data, and the positional coordinates data is associated with the landscape data.

Further, the GPS positioning system has time detecting means that detects photographed time during photographing by the imaging means. The time detecting means is preferably a clock, and the photographed time is added to the landscape data.

Furthermore, the GPS positioning system comprises communication means that transmits the landscape data to a data server arranged in a remote place.

The arithmetic processing means is constituted so as to synthesize a plurality of imaging data based on a plurality of landscape data and orientation data, which have been obtained at the same positioning point.

Further, the positional positioning means has a receiving antenna for GPS and a receiver.

Primary function of the imaging means, the direction detecting means, the communication means, the time detecting means and the like of the above-described GPS positioning system will be described as follows.

On the positioning point where the mobile station performs a positioning operation, the imaging means obtains image data and the direction detecting means obtains the photographing direction as the photographing direction data. With such a procedure, survey point landscape data in which the image data and the photographing direction data are combined is obtained along with the positioning data.

Furthermore, in the case of performing full-circumference photograph by every field angle of the imaging means on a predetermined positioning point, a series of panoramic image is processed based on the photographing direction data combined. The panoramic image is very useful information in verifying the condition around the positioning point.

Still further, when the mobile station is provided with the communication means, the landscape data obtained through photographing can be transmitted to a server via the means. The server processes the image data based on direction data to form the landscape data by which the condition during positioning on the positioning point can be easily recognized.

Preferably, certification data on a measuring person (individual) are attached to the landscape data of GPS, further, hardware that is necessary for which is added.

An object and effect is explained for attaching individual certification data.

The object is to specify the measuring person. When the measuring person who measured positioning data is specified, it makes possible to compensate for accuracy of measured values accordingly. In other words, specifying the measuring person compensates for accuracy of the measured values. For example, if the measuring person has a license of a registered surveyor, reliability on the measured values is compensated.

Further, it makes possible to use an access key to the data server. When accessing to the data server that stores the positioning data, the certification data can be used as a key, which reinforces security and raises reliability on the data.

Objects to be certified and hardware are as follows.
(a) a fingerprint and a fingerprint sensor
(b) an iris and an iris sensor
(c) a face form and a CCD image sensor
(d) a voice and a microphone Preferable methods for certification are as follows.

A. Addition of the Certification Data on the Individual (1) The certification data are obtained from the sensor at each measurement. The certification data are attached to the landscape data for individual certification of the positioning operator at the positioning time.

(2) Certification is carried out on the initial setting. The individual certification data are added to the series of the measurements.

B. Data Server Accessing (1) On the landscape data stored in the data server, it makes possible to specify the operator on the basis of the certification data.

(2) On the basis of the certification data, it controls that accessing is agreed or not when storing the landscape data in the data server. Further, a storing position is automatically selected.

PREFERRED EMBODIMENTS OF THE INVENTION

The preferred embodiments of the present invention will be described based on the drawings as follows.

Figure 1:
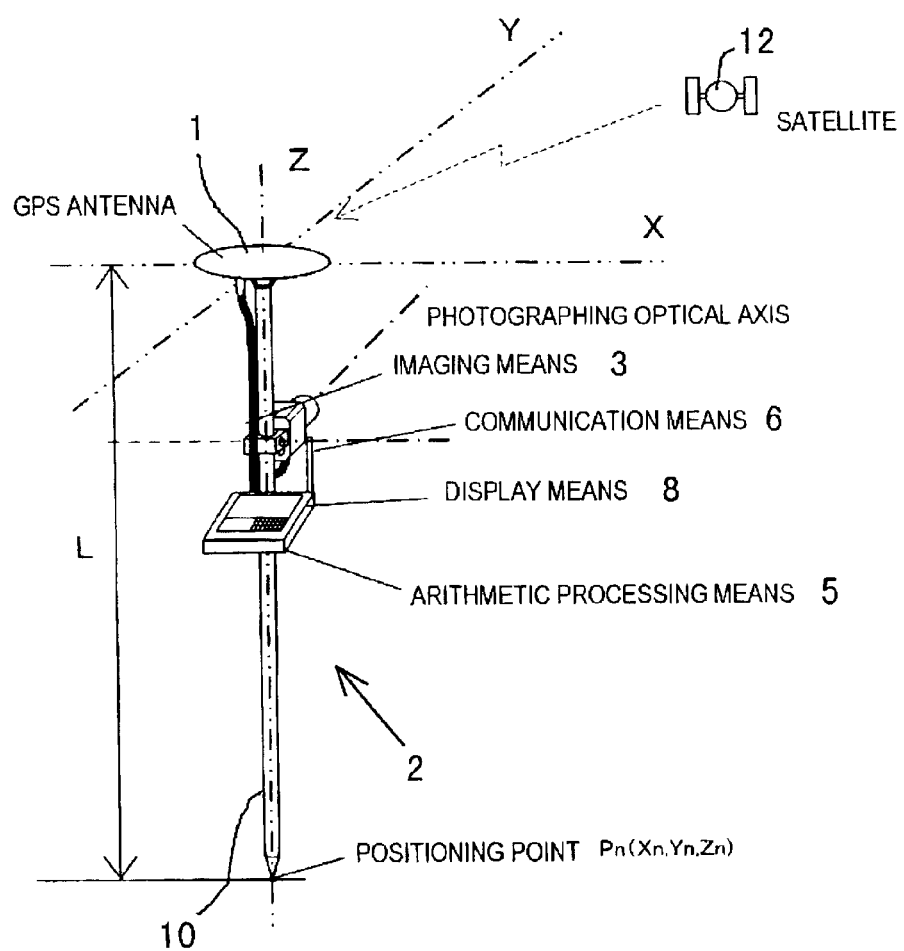
FIG. 1 is an external view schematically showing a principal section of a GPS positioning system according to an embodiment of the present invention.
Figure 2:
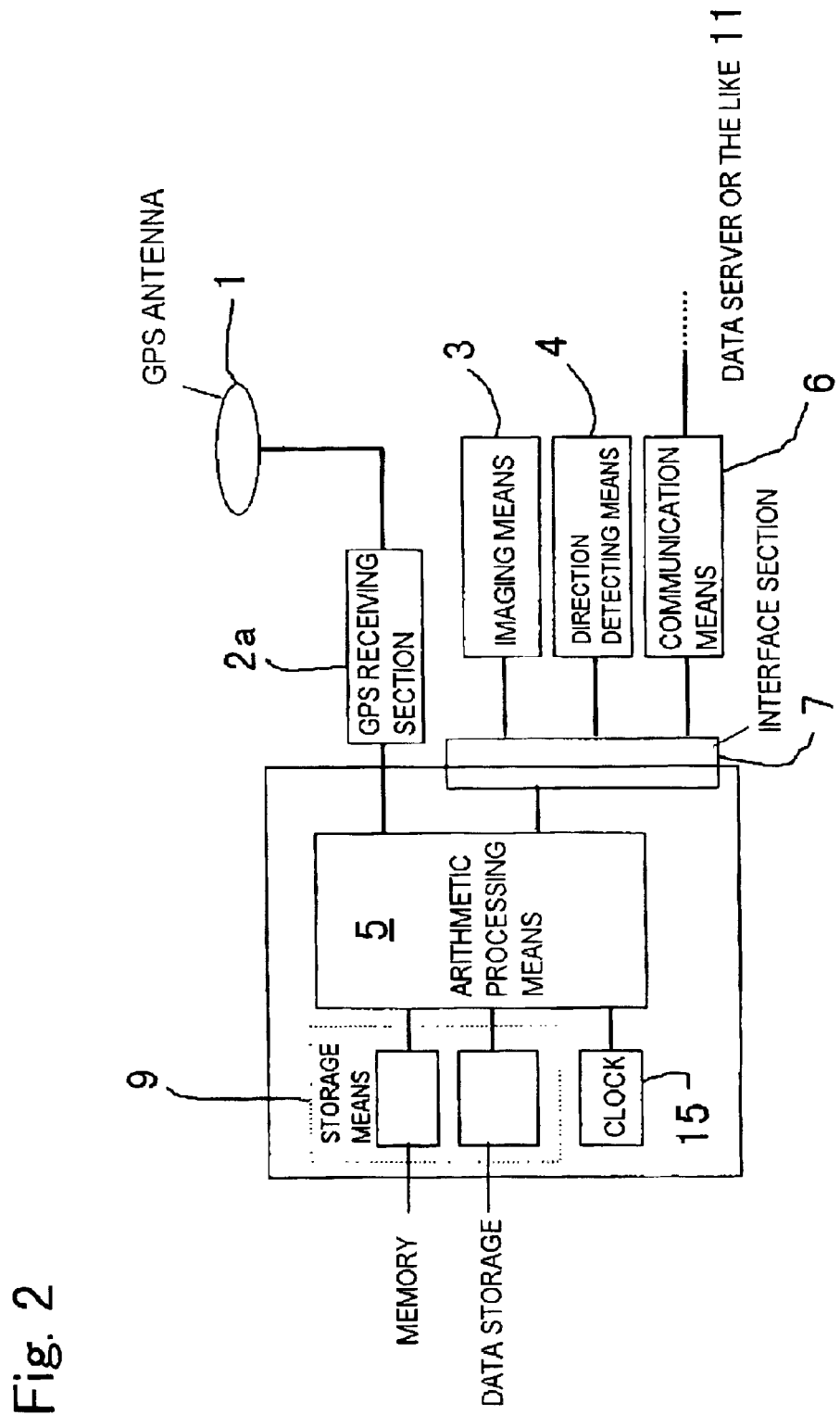
FIG. 2 is a system configuration view schematically showing the principal section of the GPS positioning system according to an embodiment of the present invention.

FIGS. 1 and 2 are the external view and the configuration view respectively, showing one embodiment of the GPS positioning system according to the present invention.

The GPS positioning system has: a receiving antenna 1 for GPS and a GPS receiver 2 connected thereto.

Further, the GPS positioning system has: imaging means 3 arranged on a predetermined position for the antenna 1 and capable of photographing arbitrary 360° direction; direction detecting means 4 capable of detecting the photographing direction; arithmetic processing means 5 connected to a GPS receiving section 2a or the imaging means 3; communication means 6 capable of two-way communication with a data server 11; an interface section 7 capable of connecting to the communication means 6; and display means 8 capable of displaying various kinds of information for an operator.

Furthermore, the GPS positioning system has storage means 9 that stores data such as the positioning data and an analysis result. A memory section and a data storage section are provided in the storage means 9.

The display means 8 may be built in the receiver 2.

In addition, the receiver 2 has a bubble tube (not shown) capable of detecting perpendicularity in order to accurately install the antenna 1 on a vertical line of the positioning point, as equipment for a positioning operation.

As shown in FIG. 1, the antenna 1 can be installed on the upper end of the receiver 2. The receiver 2 is attached to a pointed rod member 10 such that the lower end of the receiver 2 can be installed accurately and easily on the positioning point.

The lower end of the rod member 10 is placed on a desired positioning point Pn (Xn, Yn, Zn) and it is kept in a perpendicular state using the bubble tube or the like, and thus the antenna 1 can be accurately arranged above the positioning point Pn (Xn, Yn, Zn).

The length of the rod member 10 is known, which is previously taken in consideration as a slippage between the positional coordinates obtained by positioning and the positional coordinates of an actual survey point.

It is preferable that these equipments have portability such that the operator can carry them and are capable of operating independently using a battery as a power source. Although a chemical secondary battery is generally used as the battery, a physical battery by an electric double layer capacitor is desirable because of its small performance degradation from a viewpoint of a stable output and a long lifetime.

The imaging means 3 is provided with a CCD sensor (not shown) and an imaging optical system (not shown) to form an image on the CCD sensor inside thereof.

The operator directs the imaging means 3 in the direction of a photographing subject and presses a photographing button (not shown) to obtain the image of the photographing subject as imaging data being image information.

Basically, the image information is obtained through photographing periphery of the site from the positioning point where the positioning operation is being done.

The imaging means 3 is fixed to the rod member 10, and its fixed position can be arbitrarily changed.

Figure 3:
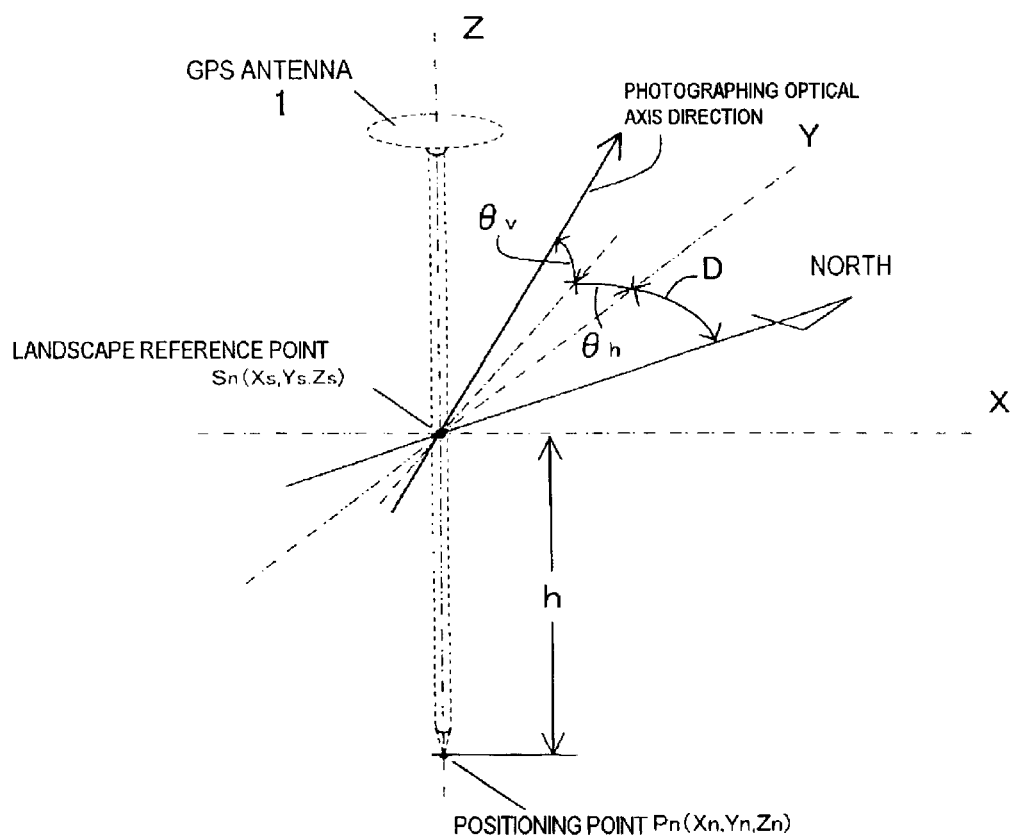
FIG. 3 is a conceptual view showing an example of positional coordinates and a direction according to the GPS positioning system of the present invention.

Referring to FIG. 3, association between the direction detected and the positional coordinates will be described.

Although the positional coordinates obtained by the positioning operation is basically the positional coordinates Pn (Xn, Yn, Zn) (N=1, 2 . . . ) of the positioning point, a slippage (h) in the perpendicular direction occurs between the arranging position of the imaging means 3 and Pn.

Therefore, the imaging data obtained by the imaging means 3 is the one having a point, which is remote above by h from the positioning point Pn (Xn, Yn, Zn), as a reference, and the point is referred to as a landscape reference point Sn (Xn, Yn, Zn).

Reference code L denotes a distance between the positioning point Pn (Xn, Yn, Zn) and the antenna 1, as shown in FIG. 1.

The landscape reference point also becomes a reference point when detecting direction data $\theta$.

The direction detecting means 4 is used to find the photographing direction of the imaging means 3, and it detects a direction of an optical axis of the imaging optical system or a direction of an index, which has a predetermined angle from the optical axis of the imaging optical system uniquely provided, for example.

The direction detecting means 4 is constituted so as to individually detect a horizontal angle $\theta h$ within a horizontal plane and an altitude angle $\theta v$ orthogonal to the horizontal plane.

The horizontal angle $\theta h$ can be obtained by angle detecting means such as an encoder while a predetermined position set at the time of initial setting is used as a reference or can be obtained as an orientation using magnetic north as a reference while geomagnetism is detected.

On the other hand, the altitude angle $\theta v$ can be obtained by using verticality found by horizontal position detecting means (not shown) as a reference or can be obtained by detecting a relative angle to the rod member 10 based on the premise that the rod member 10 is perpendicular.

Orientation data, that is, the direction data $\theta$ has at least one of the horizontal angle $\theta h$ and the altitude angle $\theta v$.

Detection of the photographing direction by the direction detecting means 4 is simultaneously performed with photographing by the imaging means 3, and it is found as the photographing direction data $\theta$ on the positioning point of the imaging data. The detection of the photographing direction by the direction detecting means 4 basically matches the optical axis direction of the imaging optical system.

The arithmetic processing means 5 associates the imaging data obtained by the imaging means 3 with the photographing direction data $\theta$, which has been simultaneously obtained with photographing by the imaging means 3, to form the landscape data.

The landscape data is the image data of a landscape when the operator views in the direction of the photographing direction data $\theta$ from the positioning point.

The landscape data found is stored in the storage means 9 that is connected to the arithmetic processing means 5.

Herein, the landscape data has the direction data that uses the landscape reference point Sn (Xn, Yn, Zn) as a reference. However, the landscape data may be treated as data on the positioning point Pn (Xn, Yn, Zn) when it is treated as peripheral landscape information because the slippage h substantially causes no influence.

Furthermore, it is preferable that the arithmetic processing means 5 adds time data to the landscape data after detecting time by the time detecting means such as a clock 15. The time data added is made to be directly obtained from the arithmetic processing means 5 or the clock 15 provided for another equipment connected thereto.

The GPS receiver 2 is desirable as the equipment that sends the time data to the arithmetic processing means 5 for its correctness.

It is preferable that the landscape data, which has been obtained by photographing on the same positioning point while shifting the direction, is synthesized into a continuous connected image (panoramic image) based on the direction data $\theta$ added.

Although the image synthesis can be performed by the arithmetic processing means 5, an arithmetic device of higher efficiency such as a data server 11 or the like can also process it.

Furthermore, in the case where the RTK positioning system comprises the communication means 6, which is used for receiving reference positioning data from a fixed station to be referred to, the communication means 6 can transmit the imaging data and the landscape data to the data server 11.

Figure 4:
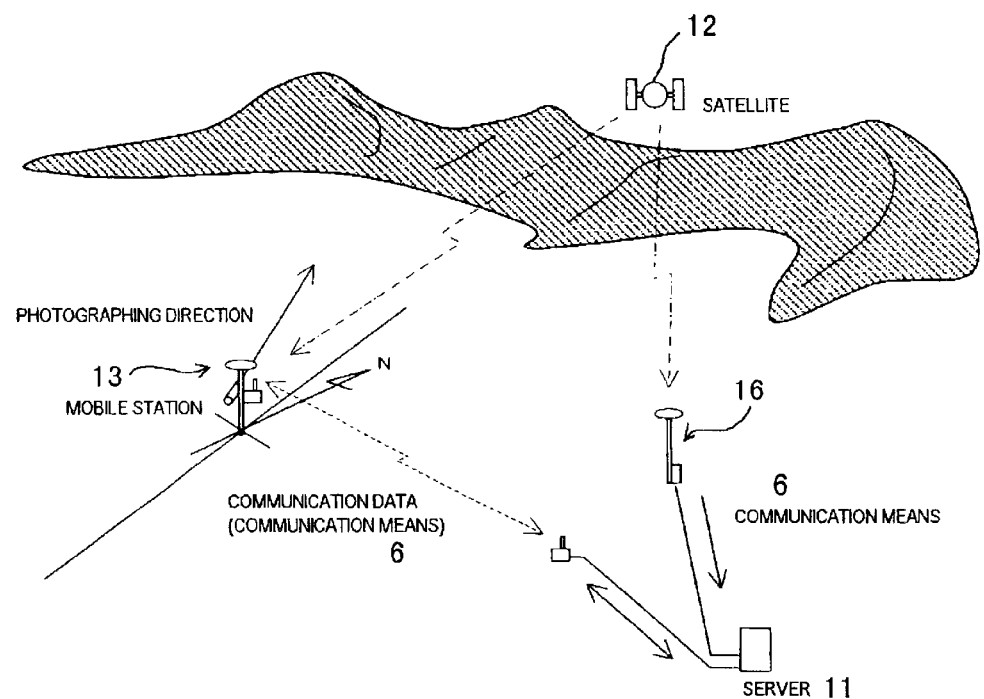
FIG. 4 is a conceptual view showing an example of an RTK positioning method using communication means according to the GPS positioning system of the present invention.

Its embodiment will be described referring to FIG. 4. A fixed station 16 is arranged in a fixed manner on a point whose positional coordinates are known, receives radio wave from a satellite 12 constantly or periodically to obtain the reference positioning data regarding an installed position. The reference positioning data is generally the one in which the receive data from the satellite 12 and the known positional coordinates are combined, which is a data format called a CMR, and the data is randomly transmitted from the communication means 6 to the data server 11.

In the case of the RTK positioning, the reference positioning data in an appropriate fixed station 16 is referred to at the time of analysis, and thus it is possible to find the positional coordinates of a mobile station 13 with higher accuracy.

Although the mobile station 13 receives the reference positioning data from the data server 11 via the communication means 6, the communication means 6 can also transmit the landscape data to the data server 11.

The data server 11 has: central arithmetic processing means; a data storage section; and a communication interface to which various kinds of data such as the reference positioning data from the fixed station 16 and the landscape data from the mobile station 13 is input.

An external line that is in always-on connection to each of a plurality of the fixed stations 16 and a wireless line capable of two-way communication to the mobile station 13 are connected to the communication interface.

Further, the external line can be connected to a network such as the Internet other than the fixed station 16. Communication with a personal computer or the like in a remote place can be performed through the line, and downloading the landscape data stored or panoramic image data where landscape data are synthesized enables a user to refer to the data on the personal computer in the remote place.

Still further, the communication interface can be used for receiving the positioning data from the mobile station 13 and transmitting the reference positioning data to the mobile station 13 as well.

Means capable of two-way communication such as a cellular phone, a PHS and a wireless LAN is desirable as a specific wireless line. Incidentally, the use of high-speed communication means can shorten time lag during analysis by the mobile station.

The central arithmetic processing means performs control of data communication via the communication interface, storage processing of the landscape data, which has been transmitted from the mobile station 13, into the storage section, synthesis processing to obtain the panoramic image data based on the direction data $\theta$ to which a plurality of landscape data have been added, and the like.

Figure 5:
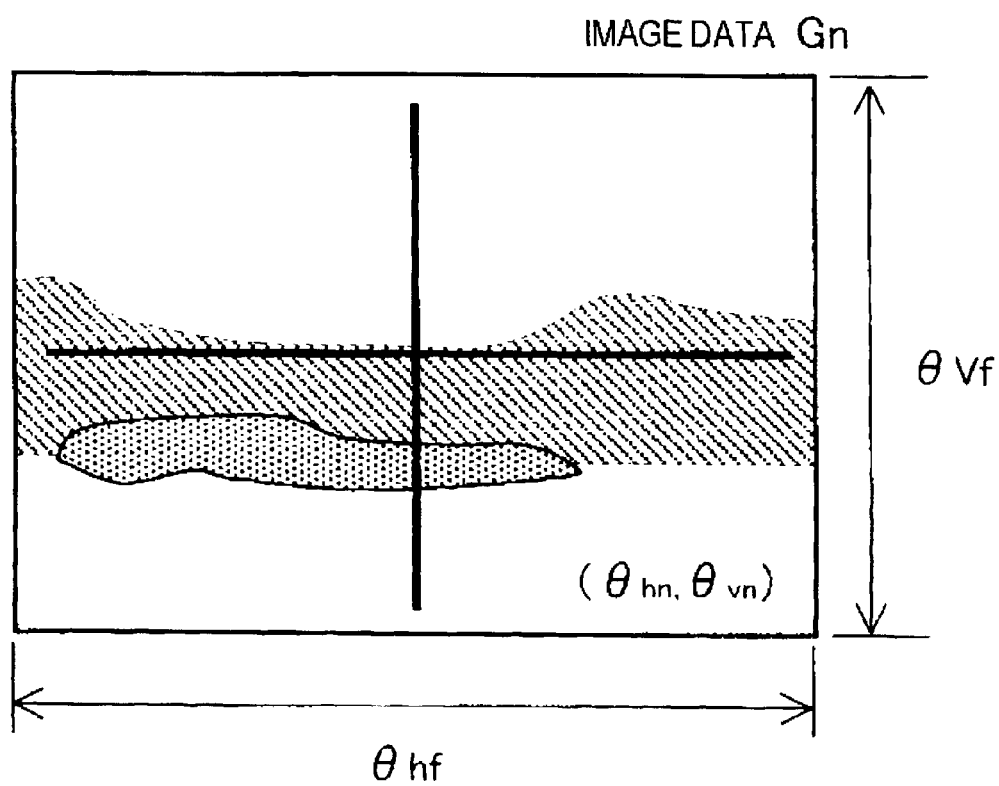
FIG. 5 is an exemplary view showing an example of landscape data according to the GPS positioning system of the present invention.
Figure 6:
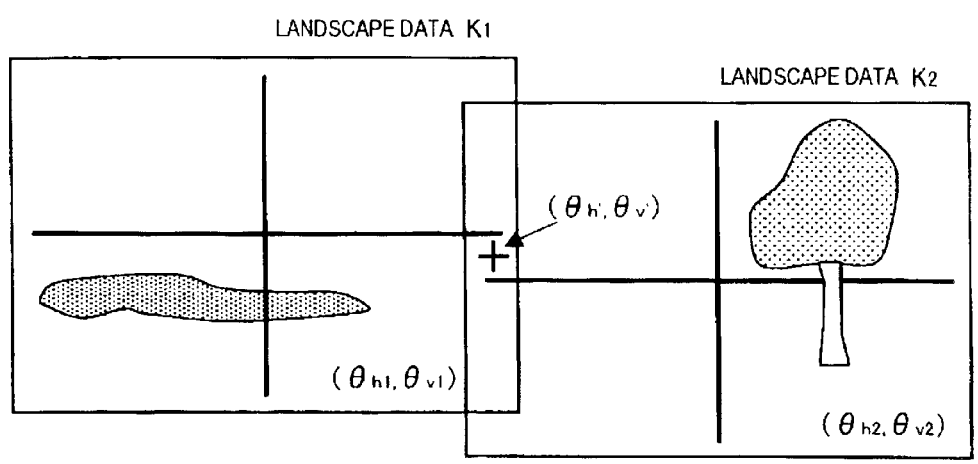
FIG. 6 is an exemplary view showing an example of a forming method of a panoramic image according to the GPS positioning system of the present invention.

FIG. 5 shows an example of the landscape data.

The image shown in FIG. 5 is an image photographed by the imaging means 3 when the optical axis (axis of collimation) of the optical system is in (θhn, θvn).

The width and the height of the image data are based on the field angle of the imaging optical system so that they can be associated with the field angle from the positioning point. Since the field angle is uniquely determined by the optical system, the positional coordinates of a predetermined positioning point in the image data corresponds to a predetermined direction.

Herein, note that the width and the height are set to (θhf, θvf) regarding the horizontal direction and the vertical direction based on the field angle of the imaging optical system.

Further, data regarding the horizontal angle θh and the altitude angle θv, which are included in the direction data, is reduced to each slippage amount of Δθh in vertical directions and Δθv in horizontal directions of the imaging data, the position is corrected according to the slippage amount (Δθh, Δθv) at the time of imaging data synthesis, and a continuous panoramic image can be thus obtained.

Herein, the slippage amount (Δθh, Δθv) can be found as follows.

$$\Delta\theta h = \theta h2 - \theta h1$$

$$\Delta\theta v = \theta v2 - \theta v1$$

The storage section is capable of flexibly storing various kinds of information such as data necessary for processing in the central arithmetic processing means, various kinds of data received from the mobile station, and information regarding a positioning operator or a user, other than the landscape data. For example, it stores a survey operation range, environmental information of the mobile station, and the like, in addition to the positional information of the fixed station, the positioning data to be received, the positioning data from the mobile station and the positional information, and they can be utilized later.

Note that the positioning data mentioned here is a generic name for data of a format defined in satellite survey, which is data or the like that could be dealt with such as receive data or positional information after analysis, for example. There exists binary data, text data or the like as the format.

An example of a specific survey operation will be described as a preferred example.

Initialization and setting of the mobile station will be described first.

With the operation procedure of a general kinematic survey, the mobile station 13 is arranged on the reference point to perform initializing operation.

At this point, the initial setting of the direction detecting means 4 is simultaneously performed if needed. It is desirably performed in the same procedure as reference angle setting in a general survey operation.

Further, when the communication means 6 is equipped, communication setting, confirmation of communication condition, or the like with the data server 11 is performed.

Next, the mobile station 13 is arranged on the positioning point based on a positioning plan, and positioning operation is performed by receiving radio wave from the satellites 12.

The operator directs the imaging means 3 in a predetermined direction to photograph the periphery of the positioning point before and after the positioning operation.

The direction detecting means 4, simultaneously with photographing operation, detects its photographing direction to obtain the direction data θ.

The direction data θ detected here is data of the optical axis direction of the imaging optical system in the imaging means 3 or data of a direction having a known predetermined angle to the optical axis.

The direction detecting means 4 is capable of individually detecting the horizontal angle θh on the horizontal plane and the altitude angle θv in a vertical plane orthogonal to the horizontal plane. Particularly, the horizontal angle may be found as an orientation based on magnetic pole.

The operator may arbitrarily perform the photographing operation, but more accurate and efficient operation can be performed when a direction to direct the imaging means 3 is displayed and indicated on the display means 8 for the operator based on its field angle.

On the other hand, by associating the imaging data with the direction data, which have been obtained by the arithmetic processing means 5, the landscape data is found and stored in the storage means 9.

In the case of the RTK, the positional coordinates may be stored in association with the landscape data because the positional coordinates of the positioning point can be found locally by receiving the reference positioning data from the fixed station 16.

An example of processing the imaging data and the direction data associating with each other is described. A position corresponding to the photographing optical axis in the imaging data (a central portion, basically) is made to be the direction data (horizontal angle θh, altitude angle θv), and each positioning point in the imaging data is associated with the direction according to the known field angle of the imaging optical system using the position as a reference.

With this association, different imaging data are processed such that associated directions are superposed, and thus forming one panoramic image. Repetition of the operation forms a full-circumference panoramic image on the positioning point.

Further, when the communication means 6 is provided, the landscape data is transmitted to the data server 11 via the communication means 6.

At this point, the landscape data may be transmitted in a form that it is added to the positional coordinates data found by the RTK, or may be transmitted after it is formed into a format where the positional coordinates are associated with the landscape data in advance.

In transmitting the imaging data, the imaging data is subject to compression processing taking load to the line during transmission into consideration, and it is transmitted to the data server 11 with the positioning data via the communication means 6.

Figure 7:
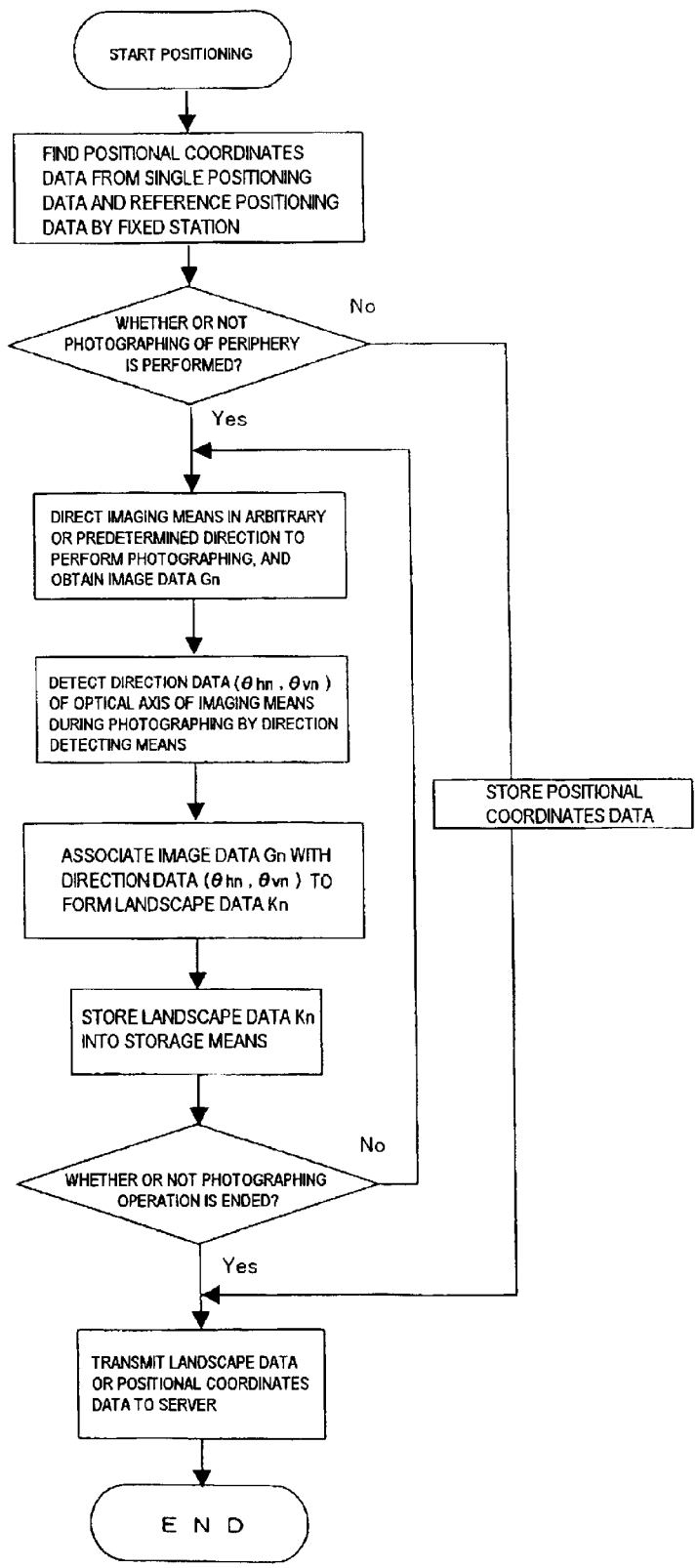
FIG. 7 is a flow chart example for generating the landscape data according to the GPS positioning system of the present invention.

Specific data processing will be described referring to FIG. 7.

(1) Find the positional coordinates data of the positioning point by the RTK method after the start of positioning.

(2) Select whether or not photographing of periphery is performed.

(3) In the case of "NO", store the positional coordinates data into the storage means 9.

(4) In the case of "YES", direct the imaging means 3 in an arbitrary or a predetermined direction to perform photographing, and obtain image data Gn.

(5) Detect the optical axis direction data (θhn, θvn) of the imaging means 3 during photographing, by the direction detecting means 4.

(6) Associate the image data Gn with the optical axis data (θhn, θvn) by the arithmetic processing means 5 to form landscape data Kn.

(7) Store the landscape data Kn into the storage means 9.

(8) Select whether or not the photographing operation on the positioning point is ended.

(9) In the case of "NO", direct the imaging means 3 in another direction to perform the photographing operation again.

(10) In the case of "YES", associate the positional coordinates data Pn on the positioning point with the landscape data Kn to store them into the storage means 9.

(11) Transmit the positional coordinates data Pn and the landscape data Kn, which have been stored, to the server 11 via the communication means 6.

(12) Move to the next positioning point.

Figure 8:
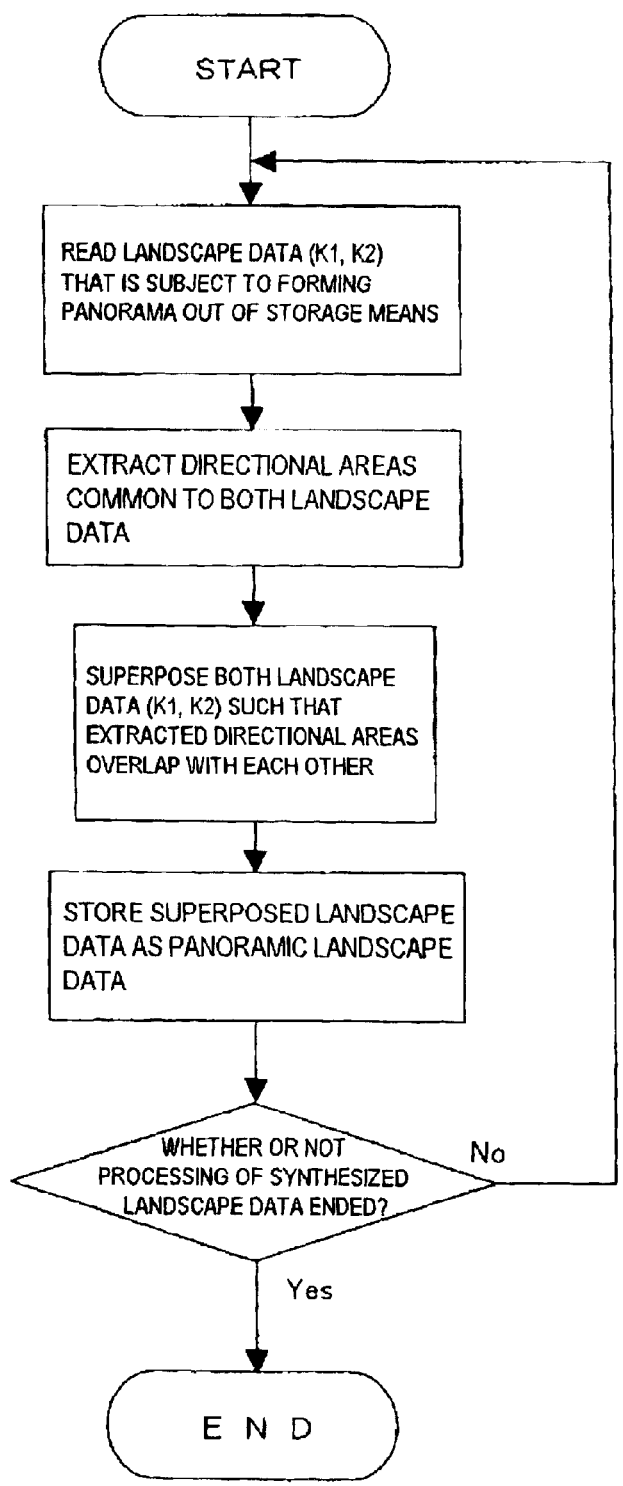
FIG. 8 is a flow chart example for generating the panoramic landscape data according to the GPS positioning system of the present invention.

An example of panoramic landscape data processing will be described referring to FIG. 8.

(1) After positioning has started, read landscape data (K1, K2) that is subject to forming panorama out of the storage means 9 first.

(2) Next, extract directional areas common to the both landscape data.

(3) Moreover, superpose the both landscape data (K1, K2) such that the extracted directional areas overlap with each other.

(4) Then, store the landscape data, which have been superposed, as the panoramic landscape data.

(5) Select whether or not processing of synthesized landscape data is ended.

(6) End processing if "YES", or return to the processing at the point of start if "NO".

According to the present invention, the status of a site of GPS positioning operation can be grasped effectively and accurately.

For example, when the GPS positioning system of the present invention is applied for RTK survey, the status of an observation point during positioning can be recorded.

Further, when the server performs processing of the image data, the status on the positioning point can be known in real time from the remote place.

Furthermore, when a direction from the positioning point of an object or the like displayed on the image is made known, it is quite easy to grasp the status of the site even on the image, and thus instructions can be clearly conveyed to the operator when the instructions are required.

What is claimed is:

1. A GPS positioning system, comprising a fixed station and a mobile station which is to be placed in plural imaging positions, wherein
    (a) said mobile station comprises: positional positioning means; imaging means; direction detecting means; and arithmetic processing means,
    (b) said imaging means of said mobile station is placed in plural imaging positions for photographing,
    (c) said positional positioning means of said mobile station is GPS positional positioning means for measuring each of positional coordinates of the plural imaging positions of said imaging means, by receiving radio wave signals from a satellite,
    (d) said direction detecting means of said mobile station detects a plurality of photographing directions during photographing by said imaging means while said imaging means is placed in each of the plural imaging positions, and
    (e) said arithmetic processing means obtains plural landscape data which comprises:
        (i) imaging data that is an output from said imaging means in each of the photographing directions while said imaging means is placed in each of the imaging positions,
        (ii) orientation data that is an output from said direction detecting means in each of the photographing directions while said imaging means is placed in each of the imaging positions, and
        (iii) positional coordinate data measured by said GPS positional positioning means at each of the imaging positions wherein the positional coordinate data are associated with the imaging data and the orientation data,
    wherein said arithmetic processing means synthesizes the plural landscape data at each of the imaging positions so as to obtain panoramic landscape data in each of the imaging positions.

2. The GPS positioning system according to claim 1, wherein the panoramic landscape data are data for forming a full-circumference panoramic image in each of the imaging positions.

3. The GPS positioning system according to claim 1, wherein said imaging means is means for photographing arbitrary 360° direction.

4. The GPS positioning system according to claim 1, wherein said mobile station further comprises a rod member, an antenna attached to said rod member, and means for detecting a perpendicular direction so as to accurately install said antenna, wherein said imaging means, said antenna and said detecting means are attached to said rod member.

5. The GPS positioning system according to claim 1, further comprising time detecting means for detecting a respective photographed time at each of the imaging positions during photographing by said imaging means, wherein the respective photographed time at each of the imaging positions is added into said landscape data.

6. The GPS positioning system according to claim 1, further comprising communication means for transmitting the landscape data to a data server arranged in a remote place.

7. The GPS positioning system according to claim 6, further comprising a certifying means for obtaining certification data of an operator, wherein the certification data are associated with the landscape data.

8. The GPS positioning system according to claim 7, wherein the certification data are used as data for controlling access in said data server.

9. A GPS positioning system, comprising a fixed station and a mobile station which is to be placed in plural imaging positions, wherein
    (a) said mobile station comprises: a positional positioning unit; an imaging unit; a direction detecting unit; and an arithmetic processing unit,
    (b) said imaging unit of said mobile station is placed in plural imaging positions for photographing,
    (c) said positional positioning unit of said mobile station is configured to measure each of positional coordinates of the plural imaging positions of said imaging unit, by receiving radio wave signals from at least one GPS satellite,
    (d) said direction detecting unit of said mobile station is configured to detect a plurality of photographing directions during photographing by said imaging unit while said imaging unit is placed in each of the plural imaging positions, and
    (e) said arithmetic processing unit is configured to obtain plural landscape data which comprises:
        (i) imaging data that is an output from said imaging unit in each of the photographing directions while said imaging unit is placed in each of the imaging positions, (ii) orientation data that is an output from said direction detecting unit in each of the photographing directions while said imaging unit is placed in each of the imaging positions, and (iii) positional coordinate data measured by said positional positioning unit at each of the imaging positions wherein the positional coordinate data are associated with the imaging data and the orientation data, wherein said arithmetic processing unit is configured to synthesize the plural landscape data at each of the imaging positions so as to obtain panoramic landscape data in each of the imaging positions.

10. The GPS positioning system according to claim 9, wherein the panoramic landscape data are data for forming a full-circumference panoramic image in each of the imaging positions.

11. The GPS positioning system according to claim 9, wherein said imaging unit is configured to perform photographing in an arbitrary 360° direction.

12. The GPS positioning system according to claim 9, wherein said mobile station further comprises a rod member, an antenna attached to said rod member, and a detecting unit that is configured to detect a perpendicular direction so as to accurately install said antenna, wherein said imaging unit, said antenna and said detecting unit are attached to said rod member.

13. The GPS positioning system according to claim 9, further comprising time a detecting unit configured to detect a respective photographed time at each of the imaging positions during photographing by said imaging unit, wherein the respective photographed time at each of the imaging positions is added into said landscape data.

14. The GPS positioning system according to claim 9, further comprising a communication unit configured to transmit the landscape data to a data server arranged in a remote place.

15. The GPS positioning system according to claim 14, further comprising a certifying unit configured to obtain certification data of an operator, wherein the certification data are associated with the landscape data.

16. The GPS positioning system according to claim 15, wherein the certification data are used as data for controlling access in said data server.

* * * * *